US005799482A

United States Patent [19]

Marler et al.

[11] Patent Number: 5,799,482
[45] Date of Patent: Sep. 1, 1998

[54] PROCESS FOR IMPROVED HEAT INTEGRATION OF AN OXIDANT-SUPPLEMENTED AUTOTHERMAL REFORMER AND COGENERATION POWER PLANT

[75] Inventors: David Owen Marler; Clinton Robert Kennedy, both of West Chester, Pa.

[73] Assignee: Mobil Oil Corporation, Fairfax, Va.

[21] Appl. No.: 919,661

[22] Filed: Aug. 28, 1997

[51] Int. Cl.$^6$ ..................................................... F02C 13/10
[52] U.S. Cl. .......................... 60/39.02; 60/39.05; 252/373
[58] Field of Search ............................. 60/39.02, 39.05; 252/373

[56] References Cited

U.S. PATENT DOCUMENTS

| | | | |
|---|---|---|---|
| 3,986,349 | 10/1976 | Egan | 60/39.02 |
| 5,048,284 | 9/1991 | Lywood et al. | 60/39.02 |
| 5,360,777 | 11/1994 | Davis et al. | 502/202 |
| 5,624,964 | 4/1997 | Cimini et al. | 518/704 |

*Primary Examiner*—Gary Geist
*Assistant Examiner*—Jafar Parsa
*Attorney, Agent, or Firm*—Robert B. Furr, Jr.; Malcolm D. Keen

[57] ABSTRACT

A process for integration of an autothermal reforming unit and a cogeneration power plant in which the reforming unit has two communicating fluid beds. The first fluid bed is a reformer reactor containing inorganic metal oxide and supplemental oxidant gas and which is used to oxidize light hydrocarbons, primarily by oxidant supplied from the inorganic metal oxide and secondarily supplied by supplemental oxidant gas, at conditions sufficient to produce a mixture of synthesis gas, hydrogen, carbon monoxide, and carbon dioxide. The second fluid bed is a combustor-regenerator which receives reduced inorganic metal oxide from the first fluid bed and which provides heat to heat the inorganic metal by combusting fuel gas in direct contact with the inorganic metal oxide producing hot flue gas. In preferred embodiments, steam is also fed to the reformer reactor and a catalyst may be used with the inorganic metal oxide and supplemental oxidant gas. The supplemental oxidant gas can be oxygen, enriched air or air.

The cogeneration power plant has a gas turbine equipped with an air compressor and a combustor and in the integration a portion of compressed air is drawn off from the power plant gas turbine air compressor leaving remainder compressed air; the drawn off compressed air is introduced to the combustor-regenerator; the hot flue gas from the combustor-regenerator is mixed with the remainder of the compressed air to produce a recombined gas stream and this recombined gas stream is fed to the combustor of the cogeneration gas turbine power plant.

20 Claims, 1 Drawing Sheet

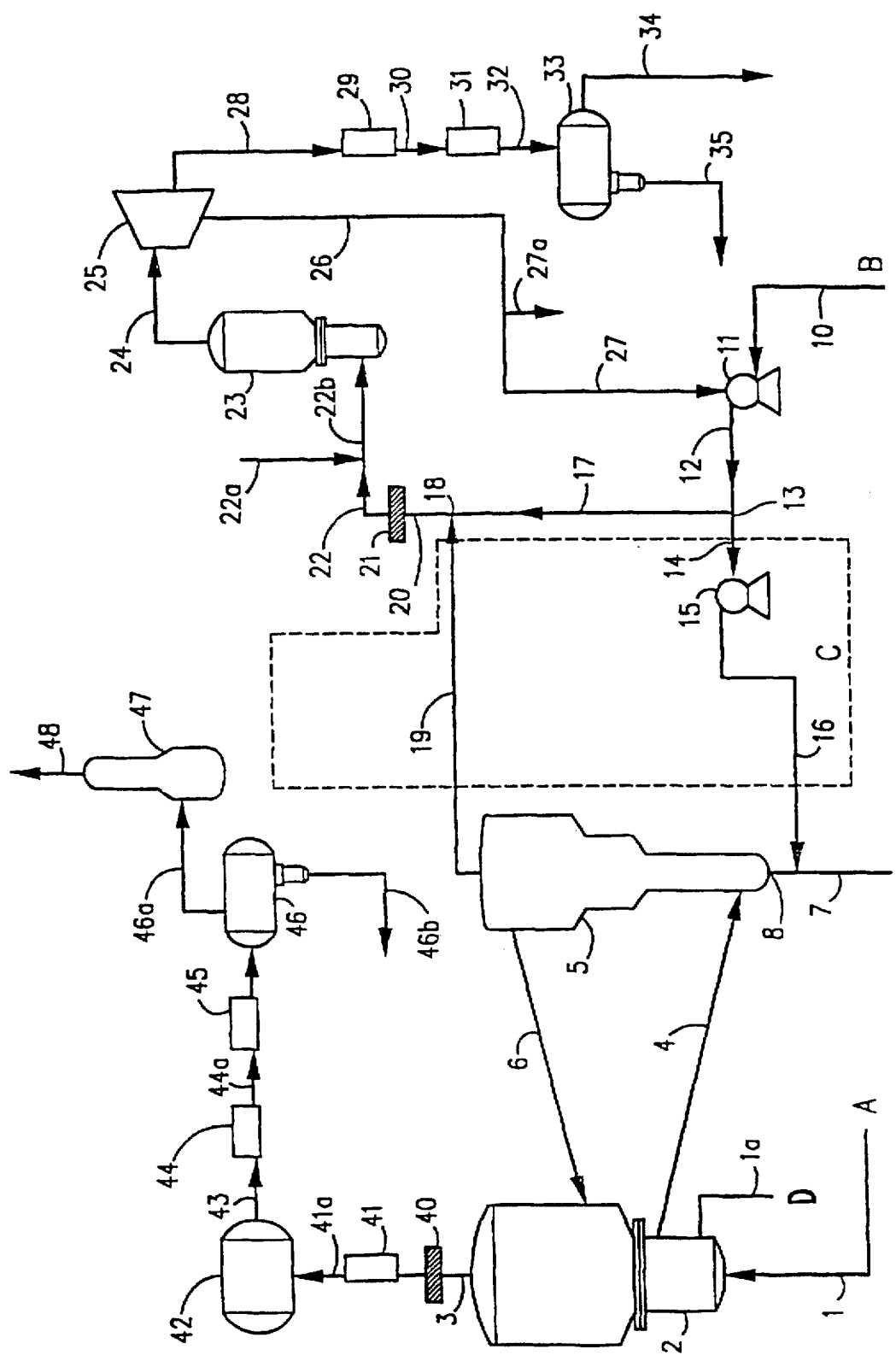

PROCESS FOR IMPROVED HEAT INTEGRATION OF AN OXIDANT-SUPPLEMENTED AUTOTHERMAL REFORMER AND COGENERATION POWER PLANT

BACKGROUND OF THE INVENTION

The invention relates generally to a process for reforming hydrocarbons in a reforming unit, and more particularly, to an improved process for reforming methane and light hydrocarbons using supplemental air, enriched air, or oxygen in an integrated autothermal reformer and cogeneration power plant, resulting in the production of synthesis gas, synthesis gas by-products, and power with an improved thermal efficiency.

Processes for reforming of light hydrocarbons to produce various synthesis gases and synthesis gas products are well known in the art. Conventional processes for reforming of light hydrocarbons use steam or oxygen in a reformer.

Steam reforming of light hydrocarbons, to produce hydrogen and carbon monoxide, as shown in (1), is a widely used commercial process.

$$CH_4 + H_2O \rightarrow CO + 3H_2 \tag{1}$$

$$\Delta H = 49.3 \text{ KCAL/mol}$$

Due to the presence of excess steam, some of the carbon monoxide and steam react simultaneously as indicated by the water gas shift reaction (2).

$$CO + H_2O \rightarrow CO_2 + H_2 \tag{2}$$

In the refining industry, steam reforming is a major component of most hydrogen production complexes. Approximately 90% of the hydrogen from a hydrogen plant is produced directly by steam reforming in a steam reformer reactor. The remaining 10% is produced via the water-gas shift process which requires CO produced in the reformer. Steam reforming is also an integral component in methanol production from natural gas (3) as well as in Fischer-Tropsch processes (4)

$$CO + 2H_2 \rightarrow CH_3OH \tag{3}$$

$$CO + 2H_2 \rightarrow 1/n\,(CH_2)_n + H_2O \tag{4}$$

In response to increasing environmental concerns, the demand for hydrogen and methanol are expected to increase, leading to a need for additional reforming capacity. Therefore, improved integrated processes, resulting in improved efficiency and, hence, lower utility costs, are timely and attractive options.

Steam reforming is traditionally carried out in multitubular fixed bed reactors which are heated on the outside in a furnace. The disadvantages of traditional steam reforming in multitubular fixed bed reactors are described in U.S. Pat. No. 5,624,964.

One approach for eliminating some of the disadvantages of the multitubular fixed bed reactors for steam reforming processes, e.g., eliminating costly heat transfer surfaces, is through the use of two communicating fluid beds, either of which could be an upflow or downflow fixed bed, a fast fluid bed or a circulating fluid bed. In such a design, reforming catalyst is heated directly, via combustion of fuel gas, in one of the fluid beds in a combustor-regenerator, and then the hot catalyst is conveyed to the other fluid bed in a reformer reactor, in which the steam reforming reaction is carried out.

In this way, the heat gained in the bed in which the combustion is carried out can be transferred to the reformer section supplying the required sensible heat and endothermic reaction heat for the reforming reaction (1). The recycling of the reforming catalyst to a combustion zone also regenerates the catalyst by burning off any coke formed during the reforming reaction. Since the continuous regeneration eliminates concerns over continuous coke build-up and, hence, permanent catalyst deactivation, lower steam to carbon ratios can be used resulting in further utility savings.

One major obstacle to such a design is the fact that steam reforming is normally carried out under pressure (150–400 psig) and, therefore, the air required for combustion and, hence, catalyst heating, must be compressed to preserve the pressure balance in the catalyst circulation loop. The cost of energy required for this compression is very high and, to some degree, off-sets the improved heat transfer benefits relative to the traditional non-contact heat transfer. A portion of the energy expended to compress the external gases sent to the combustor-regenerator can potentially be recovered by expanding the hot, pressurized gases exiting the combustor-regenerator, after separation from the solids, to a turbine to produce power. The inability of conventional turbines to operate at high temperatures (>1400° F.) with entrained particulates, due to excessive turbine blade erosion, provides a second major process obstacle. Filtration of hot gases is an option only if the flue gas is first cooled to a temperature for which commercial catalyst filters are available. Cooling via some external medium entails a further reduction in the thermal efficiency. At these low temperatures very little net energy is gained in excess of the energy required for compression which leads to a high investment cost and a loss in thermal efficiency.

These obstacles were overcome in U.S. Pat. No. 5,624,964, by integration of a steam reforming process, composed of two communicating fluid beds containing catalyst, with a cogeneration power plant wherein a fluidized bed process unit is integrated with a combined cycle power plant. In U.S. Pat. No. 5,624,964 the integration, in part, involves drawing off a portion of compressed air from a compressed air flow from a gas turbine power plant compressor and this "borrowed" compressed air is introduced into a combustor-regenerator of a steam reforming unit together with fuel gas. In U.S. Pat. No. 5,624,964, a small booster compressor for the borrowed air may be used to compensate for pressure drop in the combustor, and the "borrowed" compressed air and also some extra heat is later returned to the power plant by mixing hot, compressed off gases from the combustor-regenerator with the power plant compressed air flow which is being conveyed to the power plant combustor. The mixing of the hot flue gases and the rest of the compressed air flow lowers the temperature of the off gases sufficiently to allow removal of catalyst fines by filtration, without any thermodynamic losses. At the same time, the temperature and pressure of the air flow to the power plant combustor in the integrated process of U.S. Pat. No. 5,624,964 are increased to facilitate combustion.

Although the integrated process of U.S. Pat. No. 5,624,964 has many advantages, such as, e.g., a) increased efficiency by elimination of the need for a large air compressor for the combustor-regenerator section of the steam reforming process, b) thermally efficient utilization of the energy of hot combustion gases by mixing with the excess cold air to permit filtration of the particulates with no thermodynamic efficiency loss compared to non-integrated gas turbines, c) reduction of the need to maintain very low single pass coke production since catalyst is continuously regenerated, allowing a reduction in excess steam to the reformer, and d) reduction in combined cycle power plant compression and combustion costs through the introduction of hot, compressed gases from the fluidized bed regenerator, it is always desirable to increase efficiency and reduce the cost of plants and processes which thermally reform hydrocarbons.

Oxygen reforming of light hydrocarbons, to produce hydrogen and carbon monoxide, as shown in the net reaction (5) is well known.

$$CH_4 + O_2 \rightarrow CO + H_2 + H_2O \tag{5}$$

$$\Delta H = -8.5 \text{ KCAL/mol}$$

Water in the form of steam is generated in this process and reacts with carbon monoxide as shown in (2) above, and oxygen reforming can also be an integral component in methanol production as shown in (3) above and in the Fischer-Tropsch process as shown in (4) above.

Traditionally, the autothermal reforming reaction with oxygen has been carried out by co-feeding pure oxygen as the primary source of oxygen to the reactor along with methane or other hydrocarbons along with steam. Unfortunately, the use of pure oxygen as the primary source of oxygen in the prior art autothermal reforming processes requires the use of capital intensive cryogenic units for air separation. In fact, it has been estimated that 50% of the cost of an autothermal reformer is associated with the expense of air separation. Alternatively, if air is used as the primary source of oxygen in traditional autothermal reforming, it introduces substantial amounts of nitrogen diluent to the syngas. This is a significant disadvantage because nitrogen diluents effect the synthesis gas products and by-products, increase the size of plant equipment, adversely effect heat duties and significantly reduce separation efficiency of the synthesis gas products and by-products.

The concept of utilizing a metal oxide to react with methane to yield syngas is disclosed by Lewis et al. in *Industrial and Engineering Chemistry*, Vol. 41, No. 6, 1227–1237 (1949). In this study, Lewis et al. investigated the use of copper oxide to aid in the autothermal reforming of methane and fed the solid powder from a reservoir tube into the gas stream which carried the powder into the reactor. An example of the overall reaction for reacting a metal oxide with methane to produce syngas is shown in (6) below:

$$CH_4 + 2MO_{x+1} \rightarrow H_2 + CO + 2MO_x + H_2O \tag{6}$$

where x is an integer which renders the metal oxide charge neutral.

Although Lewis et al. indicate that energy is released in two stages (1) oxidation of the hydrocarbon by the metal oxide and (2) reoxidation of the metal oxide and that the metal oxide can be reoxidized by air, the process and apparatus of Lewis et al. are disadvantageous because they underutilize the process and do not make use of the economic value of the heat, including the hot, compressed off gas in a combustor-regenerator.

Among other disadvantages, the prior art process using many of the inorganic metal oxides as the sole oxidant in the reformer reactor operating at temperatures of about 1650° F. or higher, the temperature of efficient reforming processes, cannot be operated at high temperatures, e.g., at 1750° F. or higher, the temperature of many typical, combustor-regenerators, because of the instability or degradation of the inorganic metal oxides at such temperatures. To provide a heat balanced process at reasonable oxide circulation rates, the combustor-regenerator must be operated at a temperature at least about 100°–150° F. greater than the reformer. The combustor temperature, e.g., 1750° F., eliminates many potential reducible inorganic metal oxides that would be capable of undergoing redox cycles and that could potentially transfer significant quantities of oxygen from consideration due to phase stability issues.

SUMMARY OF THE INVENTION

The foregoing disadvantages have been overcome by lowering the temperature requirements so that inorganic metal oxides capable of undergoing redox cycles and having lower thermal stability can be utilized in an autothermal reformer having two communicating fluid beds. Additional advantages are achieved by the integration of the autothermal reformer having two communicating fluid beds, with a cogeneration power plant, i.e., when a fluidized bed autothermal reformer unit is integrated with a combined cycle power plant where an inorganic metal oxide capable of undergoing redox cycles is utilized to oxidize hydrocarbon (and syngas) in the reformer reactor. By introducing supplemental oxidant gas, i.e., oxygen, air, or enriched air, directly into the reformer reactor the heat requirements of the reforming reaction are balanced, i.e., the heat duty requirements supplied by the combustor-regenerator are lowered, thereby reducing the operating temperature of the combustor-regenerator. Furthermore, by heat integration, syngas, syngas products, e.g., Fischer-Tropsch products, methanol, and other oxygenates, power, and steam, can be produced with an improved efficiency compared to non-integrated processes or the integrated steam reforming process described above.

An inorganic metal oxide capable of undergoing redox cycles is used in the process of the present invention to oxidize hydrocarbon and a portion of the syngas in the reformer reactor and this is supplemented in the reformer by additional oxygen, air, or enriched air supplied from a suitable source. In the syngas reactor, i.e., the autothermal reformer reactor, the inorganic metal oxide undergoes a reduction thereby oxidizing the hydrocarbon and syngas while the supplemental oxygen, air, or enriched air is added directly to participate in the autothermal reforming reaction. The reduced inorganic oxide is then converted back to its oxidized form with air in the combustor-regenerator.

The autothermal reformer, or autothermal reformer unit, as defined and used herein, has two communicating fluid beds such that the inorganic metal oxide (a redox "oxygen" carrier) exits the first fluid bed in an autothermal reformer reactor in a reduced oxidation state, at a temperature of $T_1$ and, following separation from the reformer gas products, enters a second fluid bed in a combustor-regenerator operating at a temperature of $T_2$ such that $T_2$ is greater than $T_1$. The autothermal reformer of the present invention does not require external sources of heat during operation; however, as an option, heat may be derived from external sources, such as, e.g., steam when supplemental steam is used in the process, heated hydrocarbon feed gas streams, heated supplemental oxidant, i.e., heated oxygen, enriched air, or air, and the like. In the combustor-regenerator, coke is burned off the inorganic metal oxide and the redox (reduction-oxidation) inorganic metal oxide material is converted to a higher oxidation state. In accordance with the present invention, the redox material exiting the combustor-regenerator at temperature $T_2$ re-enters the autothermal reformer reactor where the heat accumulated in the combustor-regenerator is used to heat the feed into the reformer and supply heat to the syngas reaction.

As described in U.S. Pat. No. 5,624,964, the integration, in part, involves drawing off a portion of compressed air from a compressed air flow from a gas turbine power plant compressor. This "borrowed" compressed air is introduced into the combustion section, i.e., the combustor-regenerator, of the autothermal reformer reactor together with fuel gas. A small booster compressor for the borrowed air is optionally utilized to compensate for pressure drop in the combustor-regenerator. The "borrowed", compressed air and also some extra heat is later returned to the power plant by mixing hot, compressed off gases from the combustor-regenerator with the power plant compressed air flow which is being conveyed to the power plant combustor. The mixing of the hot flue gases and the rest of the compressed air flow lowers the temperature of the off gases sufficiently to allow removal of inorganic metal oxide fines and other fines by filtration, without any thermodynamic losses. At the same time, the temperature and pressure of the air flow to the power plant combustor are increased to facilitate combustion.

Generally, in accordance with the present invention, there is provided a process for heat integration of an oxidant-supplemented autothermal reformer and a cogeneration power plant in which the cogeneration power plant has a gas turbine equipped with an air compressor and a combustor. The autothermal reformer has two communicating fluid beds; a first fluid bed comprising a reformer reactor containing inorganic metal oxide capable of undergoing reduction-oxidation reaction cycles and which, with a source of supplemental oxidant gas, is used to oxidize hydrocarbons at conditions sufficient to produce a mixture comprising synthesis gas hydrogen, carbon monoxide, or carbon dioxide or mixtures thereof, a second fluid bed comprising a combustor-regenerator which receives spent inorganic metal oxide from the first fluid bed and which provides heat to heat the inorganic metal oxide by combusting fuel gas in direct contact with the inorganic metal oxide, also producing hot flue gas. In addition to burning the coke off the inorganic metal oxide and heating the inorganic metal oxide, the reoxidation of the inorganic metal oxide also liberates heat by an exothermic reaction.

The inorganic metal oxide circulates between the first-fluid bed and second fluid bed, wherein the inorganic metal oxide oxidizes hydrocarbon and syngas in the first fluid bed in the reformer reactor and the reduced inorganic metal oxide is regenerated and heated in the second fluid bed in the combustor-regenerator and regenerated, heated inorganic metal oxide is returned to the first fluid bed. A portion of compressed air is drawn off from a compressed air stream from the air compressor of the power plant gas turbine air compressor; the drawn off compressed air is introduced to the combustor-regenerator; the hot flue gas from the combustor-regenerator is mixed with the remainder of the power plant compressed air stream to produce a recombined gas stream and this recombined gas stream is fed to the combustor of the cogeneration gas turbine power plant. In the process of the present invention, supplemental oxidant gas is introduced into the first fluid bed. The introduction of the supplemental oxidant gas is preferably continuous; however, in certain aspects of the present invention, introduction of the supplemental oxidant gas may be intermittent. Furthermore, the circulation of the inorganic metal oxide is preferably continuous; however, in certain aspects of the present invention, the circulation of the inorganic metal oxide may be intermittent.

In certain aspects, the process of the present invention further comprises a reformer reactor containing catalyst, and the catalyst and the inorganic metal oxide are circulated together, wherein the catalyst is spent and the inorganic metal oxide is reduced in the first fluid bed and the spent catalyst is regenerated and the reduced metal oxide is oxidized in the second fluid bed while supplemental oxidant gas is supplied to the first fluid bed. In certain other aspects of the present invention, the process also includes feeding steam to the reformer reactor, i.e., the process is a steam-assisted autothermal reaction wherein steam is added to the autothermal reformer reactor. In one aspect of the present invention, supplemental oxidant gas is fed to the first fluid bed with the supplemental steam.

In addition to the advantages listed above, the process of the present invention generally has the advantages of the prior art integrated steam reformer unit and cogeneration power plant of U.S. Pat. No. 5,624,964. Furthermore, since the autothermal process of the present invention does not use enriched air or air as the primary source of oxygen in the autothermal process, i.e., for the reforming reaction, it does not introduce any substantial amounts of nitrogen diluent to the syngas product as would be the case if enriched air or air was added directly to the reformer reactor as the primary source of oxygen for the reforming reaction. This is a significant advantage in the downstream processing of the syngas where the nitrogen diluent impacts equipment size, heat duties, and separation efficiency. Furthermore, by the introduction of supplemental oxidant gas into the first fluid bed to provide supplemental oxidant for the reforming reaction, the temperature requirements for the combustor-regenerator can be lowered so that inorganic metal oxides having lower thermal stabilities, e.g., less than about 1750° F., and the amount of inorganic metal oxide required for circulation and fluidization may be reduced. This would minimize erosion concerns, and potentially permit the use of less exotic materials of construction and minimize the use of ceramic linings in the equipment.

An advantage of the process of the present invention compared to an integrated steam reformer is that the overall inorganic metal oxide circulation rates can be reduced at constant $T_2$ temperature which are promoted by the introduction of supplemental oxidant gas into the first fluid bed. This is due to lower heat requirements of the circulating material which are lowered since the autothermal reforming with the use of supplemental oxidant gas is not as energy-demanding as steam reforming. At constant circulation rates the operating temperature of the combustor-regenerator ($T_2$) could be reduced by the use of the supplemental oxidant gas. It is this aspect of the process of the present invention which, in certain instances, permits efficient operation of the autothermal reformer unit even with intermittent circulation or cycling of the inorganic metal oxide from the reformer reactor to the combustor-regenerator.

A further advantage of the process of one aspect of the present invention which is steam-assisted, is the ability to tailor the $H_2/[2CO+3CO_2]$ and the $CO_2/CO$ molar ratios by varying the amount of steam, inorganic metal oxide and supplemental oxidant that is fed to the autothermal reformer. Preferably the $H_2/[2CO+3CO_2]$ molar ratio is about 1 and the $CO_2/CO$ molar ratio is as low as possible, preferably lower than about 0.5. This flexibility in a single reactor is unique and is a considerable advantage when integrating the syngas process with downstream operations to produce methanol or Fischer-Tropsch products.

Additional features and advantages of the invention will be set forth in the description which follows, and in part will be apparent from the description, or may be learned by practice of the invention. The objectives and other advantages of the invention will be realized and attained by the process, apparatus and system particularly pointed out in the written description and claims hereof as well as the appended drawing.

It is to be understood that both the foregoing general description and the following detailed description are exemplary and explanatory and are intended to provide further explanation of the invention as claimed.

The accompanying drawing which is included to provide a further understanding of the invention and is incorporated in and constitutes a part of this specification, illustrates an embodiment of the invention and together with the description serves to explain the principles of the invention.

BRIEF DESCRIPTION OF THE DRAWING

The drawing is a diagrammatic flowsheet of the invention.

DETAILED DESCRIPTION OF THE INVENTION

In the process of this invention, an oxidant-supplemented autothermal reformer unit and a cogeneration gas turbine power plant are integrated. The oxidant-supplemented autothermal reformer has two communicating fluid beds such that the reforming inorganic metal oxide continuously or intermittently exits the first fluid bed, the reformer reactor, at a temperature of $T_1$ and, following separation from the reformer gas products, enters a second fluid bed, the combustor-regenerator, at $T_2$, such that $T_2 > T_1$ while supplemental oxidant gas is introduced into the first fluid bed.

As used herein, supplemental oxidant gas is air, enriched air or oxygen. Enriched air is air in which at least about 25% to about 90% of the nitrogen has been removed. The amount of supplemental oxidant used in the process of the present invention is not critical as long as there is an amount sufficient to introduce a "trim" amount of air, enriched air or oxygen to the autothermal reformer reactor. The amount of supplemental oxidant gas added via "trimming" is the quantity required to balance the heat requirements of the reforming reaction which are easily determined by one skilled in the art by monitoring the syngas quality as defined by $H_2/[2CO+3CO_2]$ and/or $CO_2/CO$. Generally, in accordance with the process of the present invention, the supplemental oxygen (from air, enriched air or oxygen) is introduced in an amount sufficient to provide less than about 50 mol % of the total oxidant for the reforming reaction with the light hydrocarbons, preferably in an amount sufficient to provide less than about 25 mol % of the total oxidant for the reforming reaction with the light hydrocarbons and more preferably in an amount sufficient to provide less than about 15 mol % of the total oxidant for the reforming reaction with the light hydrocarbons. Generally, the process is improved with an amount sufficient to provide greater than about 3 mol % and less than about 50 mol % of the total oxidant required for the reforming reaction with light hydrocarbons. The amount of the particular supplemental oxidant gas required to achieve a particular amount of oxygen based on the total amount of oxidant required for the particular hydrocarbon varies according to the amount of oxygen in the supplemental oxidant gas, i.e., whether it is air, enriched air or oxygen (pure oxygen), and one skilled in the art can easily determine these amounts by conventional stoichiometric calculations and monitoring the content of the reformer reactor products.

The supplemental oxidant gas is preferably continuously introduced into the reformer reactor; however, it may also be introduced intermittently as long as the required amount of supplemental oxidant gas is maintained in the reformer reactor. The supplemental oxidant gas may be introduced into the reformer reactor directly by at least one feed stream into the reformer reactor.

The source of air, enriched air or oxygen is not critical and can be easily supplied by one skilled in the art from conventional and/or convenient sources well known in the art. The pressure at which the supplemental oxidant gas is fed into the reformer reactor is not critical, however, generally, the supplemental oxidant gas is fed into the reformer reactor at about 20 psig, to about 1000 psig, preferably about 150 psig to about 600 psig, and more preferably, about 150 psig to about 450 psig.

As used herein, the primary source of oxidant is defined as the oxidant derived from the inorganic metal oxide and is at least about 50 mol %, preferably greater than about 75 mol %, and more preferably greater than about 85 mol % of the total oxidant requirements for the hydrocarbon reforming reaction.

The autothermal reformer unit reforms hydrocarbons with inorganic metal oxides which are capable of undergoing reduction-oxidation cycles to supply the primary source of oxidant in the reformer reactor to oxidize the hydrocarbons supplied to the reformer reactor and a portion of the syngas which is formed in the reformer reactor. Additional oxidant gas is also supplied to the reformer reactor to supplement the primary source of oxidant derived from the inorganic metal oxide. The hydrocarbons reformed by the process of the present invention are generally referred to as light hydrocarbons or light paraffins and preferably include, but are not limited to, e.g., methane, ethane, liquid petroleum gas (LPG), naphthas, typically virgin naphthas or cracked naphthas, such as, e.g., light naphthas, full range naphthas or even heavy naphthas, refinery off gas, associated gas, and the like. An advantage of the process of the present invention in those embodiments wherein the inorganic metal oxide is continuously regenerated and wherein supplemental oxidant gas is continuously supplied to the reformer reactor, is that heavier feeds, i.e., the naphthas and the like, can be easily oxidized, i.e., reformed, in the reformer reactor, thus eliminating the need for feeding steam to the reformer reactor or reducing the amount of steam fed to the reformer reactor. Product streams resulting from the autothermal process of the present invention generally consist of hydrogen, carbon monoxide, carbon dioxide, steam, e.g., steam from the water of reaction when excess steam is not fed to the reformer reactor, or steam from added steam in the steam-assisted embodiments, and unreacted hydrocarbon.

In certain preferred aspects of the present invention, the inorganic metal oxide which must be capable of undergoing reduction-oxidation cycles in accordance with the present invention, i.e., cycles wherein the metal oxide is first reduced and subsequently oxidized or vice versa, is used only in conjunction with supplemental oxidant gas without assistance of other additives. In many preferred embodiments of the present invention, the inorganic metal oxide is used with a conventional support material as well known in the art.

The preferred inorganic metal oxides used in the present invention may be binary or ternary metal oxides or mixtures thereof. The binary metal oxides include, but are not limited to, e.g., chromium oxide, cobalt oxide, nickel oxide, titania, copper oxide, a manganese oxide, iron oxide, or mixtures thereof, and the like. The ternary metal oxides include, but are not limited to, e.g., praseodymium-cesium oxide, $SrCO_{0.5}FeO_x$, or mixtures thereof, and the like, where x is an integer which renders the metal oxides charge neutral. Mixtures of binary and ternary metal oxides may also be used in the process of the present invention. Support materials include, but are not limited to, e.g., α-alumina, kaolin, zirconia, magnesium oxide, cerium (IV) oxide, silica or mixtures thereof, and the like.

The form or forms of the oxygen, i.e., the oxidant(s), which are generated by the inorganic metal oxide to react with the hydrocarbons and syngas, i.e., to oxidize the hydrocarbons and syngas, in the autothermal reformer reactor are not definitely known. However, as a result of the reaction (oxidation), the inorganic metal oxide is reduced by oxidizing the hydrocarbon and syngas, and the reduced form of the inorganic metal oxide, defined herein as spent inorganic metal oxide, is circulated to the combustor-regenerator for reoxidation.

The inorganic metal oxide-to-hydrocarbon ratios are not critical in the process of the present invention as long as there is a sufficient amount of oxidant derived from the inorganic metal oxide and the supplemental oxidant gas to supply oxygen for reforming the hydrocarbon, i.e., for reacting with the hydrocarbon to produce syngas, syngas by-products and the like as described above. However, in certain embodiments, the inorganic metal oxide-to-hydrocarbon ratio in the autothermal reformer reactor is about 5 to about 280 weight percent, preferably about 10 to about 140 weight percent, and more preferably, about 15 to about 100 weight percent. These weights are calculated based on inorganic metal oxide circulation rates (tons per minute) and hydrocarbon feed rate (tons per minute).

The process of the present invention can be operated without additional steam feed. However, steam reforming activity is always present in the process of the present invention because even without additional steam feed, steam is generated in the autothermal reactor from the water of reaction resulting from the oxidation of the hydrocarbon. However, in certain preferred embodiments, it is desirable to supply additional steam to the reformer to provide enhanced steam reforming activity with the oxidation reforming activity (from the inorganic metal oxide and supplemental oxidant gas) in the process of the present invention. In accordance with the process of the present invention, this enhanced or additional steam reforming activity is defined as a steam-assisted process.

The inorganic metal oxide may or may not be active for catalyzing the steam and $CO_2$ reforming reactions. If a given inorganic metal oxide used in the process of the present invention is not active for the steam reforming reaction, a second catalytic component, e.g., a nickel catalyst, that is active in that service can be added. This second component can be placed on the same carrier particle as the inorganic metal oxide or on a separate carrier particle. Other conventional catalyst materials may also be used with the inorganic metal oxides in the present invention, including, but not limited to, e.g., palladium, platinum, ruthenium, iridium, rhoduim, cobalt, or mixtures thereof. Various metal combinations also known in the art may also be used as catalyst materials with the inorganic metal oxides, including, but not limited to, e.g., nickel/cobalt, nickel/platinum, and the like. Thus, if the inorganic metal oxide does not provide catalytic activity for the steam reforming or $CO_2$ reforming reactions, or if there is insufficient catalytic activity by the inorganic metal oxide for these reactions, conventional steam reforming catalysts may be used to supplement the catalytic activity, if any, provided by the inorganic metal oxide.

The particle sizes of the inorganic metal oxide and/or catalyst, including inorganic metal oxide and catalyst, on the same support material, used in the autothermal reformer unit, with or without a support material is not critical as long as the particles can be circulated from the reformer reactor to the combustor-regenerator and as long as the particles can be fluidized in the respective beds. For use in the fluidized beds of the present invention, the particle sizes are generally in the range of about 10 to about 150 microns, preferably with a majority of particles at about 40 to about 120 microns.

The inorganic metal oxide and/or catalyst particles, including any support materials are preferably attrition-resistant.

The circulation of the inorganic metal oxide particles or the inorganic metal oxide particles and catalyst particles from the reformer reactor to the combustor-regenerator and/or from the combustor-regenerator to the reformer reactor in its respective reduced (spent) or oxidized (regenerated) forms, may be continuous or intermittent. Generally, continuous circulation is preferred; however, intermittent circulation of the particles may be used where a sufficient amount of oxygen or a form of oxygen can be maintained in the reformer reactor to react with the hydrocarbon without compromising the continuous production of syngas.

Since one purpose of the circulating fluid beds in the process of the present invention is to facilitate heat transfer, one role of the combustor-regenerator is to heat the fluid inorganic metal oxide particles to a temperature above the temperature of the particles in the reformer reactor, thereby supplying a portion of the heat of reaction. Therefore, in an embodiment of the present invention, separate heat transfer particles, the sole purpose of which is heat transfer, can be added to the fluid beds. The particle sizes of such heat transfer particles and the operating characteristics and parameters of such heat transfer particles are similar to those described above for the inorganic metal oxide and the catalyst. Examples of such heat transfer particles include, but are not limited to, e.g., α-alumina, kaolin, cerium oxide ($Ce_2O_3$), $La_2O_3$, $ZrO_2$, and the like. Referring to the drawing, the heat transfer particles are heated in combustor-regenerator 5 and pass through conduit 6 to reformer reactor 2 where the heat in the heat transfer particles is transferred to the fluidized bed in the reformer reactor to provide supplemental heat for the hydrocarbon reforming reaction. Thus, the heat is depleted from the heat transfer particle and the heat-depleted transfer particle is returned through conduit 4 to combustor-regenerator 5 where it is reheated.

The types of fluidized bed processes contemplated for use herein include fast fluid beds, fixed fluid beds and circulating fluid beds. All of these applications can be utilized in either the upflow or downflow modes. A fixed fluid bed is a fluid bed in which the gas velocity is above that required for minimum fluidization but below that necessary to achieve pneumatic transport. The bed surface, although it could be highly irregular, is fairly well defined. Examples of fixed fluid beds include bubbling and turbulent fluid beds. A circulating fluid bed is a fluid bed process whereby inorganic metal oxide and any other particles are continuously removed from the bed (whether in upflow or downflow orientation) and is then re-introduced into the bed to replenish the supply of solids. At high velocities (e.g., >50 ft/sec) the solid density in the reactors is low, i.e. below about 2 lb/ft3, and, in upward flow, one calls this type of fluid bed a riser reactor. At lower velocities, while the inorganic metal oxide is still entrained in the gas stream, a relatively dense bed is formed in the reactor. This type of bed is often called a fast fluid bed. There is no clear dividing line between these types of reactors and, for the purpose of the invention, it is sufficient that we deal with inorganic metal oxide (or metal inorganic oxide and catalyst) particles in such a manner that they can easily flow between the combustion-regeneration and reaction zones, i.e., from the combustor-regenerator to the reformer reactor and from the reformer reactor to the combustor regenerator.

In the invention, the inorganic metal oxide exiting the combustor-regenerator at temperature $T_2$ enters the autothermal reformer reactor, once again, where the heat accumulated in the combustor-regenerator is used to provide heat to the reforming reaction. Since the reforming reaction is generally operated at elevated pressures, the combustor-regenerator requires a supply of combustion air at a pressure equal to the reformer operating pressure plus whatever amount of additional pressure is necessary to overcome any pressure drop in the communicating bed loop. Compressed air to the combustor-regenerator is provided by integration with a cogeneration gas turbine power plant.

In a cogeneration power plant, power is generated by burning fuel gas at moderate pressures (e.g., about 200–400 psig) to produce hot, pressurized gases which are then expanded and cooled to produce power and steam, respectively. An amount of air far in excess of that stoichiometrically required (about 150–200%) for combustion of fuel in the power plant combustor, is initially compressed to the desired gas turbine inlet pressure (e.g., about 200–400 psig). This large excess of air is needed to serve as a heat sink in the power plant combustor to moderate the combustion exotherm and maintain the combustor temperature within the constraints set by the associated hardware. Since the compressed air is available in excess, a portion of the compressed air exiting the cogeneration power plant gas turbine compressor is borrowed for use in the combustor-regenerator. The diluent air, previously used to control the temperature in the power plant combustor is replaced by hot, pressurized off gases from the combustor-regenerator which are fed back to the combined cycle power plant and mixed with the remaining airflow as gas flow for the power plant combustor. Such integration reduces the operation and capital costs otherwise associated with a fluid bed autothermal reforming process.

Entrained solids in the hot off gases from the combustor-regenerator can damage the power plant gas turbine blades as a result of erosion. Therefore, the combustor-regenerator hot off gases are filtered to remove the entrained particulates. The temperature tolerance of commercially available filters for this purpose is limited to e.g., about 1450° F., and the temperature of the hot off gas exiting the combustor-regenerator is generally well above this limit. The hot off gases can be sufficiently cooled by mixing with the remainder of the cooler power plant gas turbine compressor air flow. The mixture of hot flue gas and the cooler compressed power plant air flow equilibrate to an acceptable temperature such that the mixed gas stream can be passed through a filter and then sent to the power plant combustor.

Using the integrated fluidized bed autothermal reformer has additional advantages over the traditionally used multi-tubular reactors which use steam. Ordinary steam reforming requires a large amount of excess steam which is needed to suppress coke formation to extend cycle life in fixed bed steam reforming operations. In the fluidized bed, the need to maintain low single pass coke production is reduced since the inorganic metal oxide is regenerated (and reoxidized), preferably continuously, in the combustor-regenerator.

The autothermal reforming processes contemplated to be used herein are those which require a pressure above about 20 psig. The preferred pressure range is from about 20 psig to about 1000 psig; preferably about 150 psig to about 600 psig; and more preferably about 150 psig to about 450 psig. The preferred temperature range of the autothermal reformer reactor is from about 1350° F. to about 2000° F., more preferably about 1600° F. to about 1850° F. Due to thermodynamic considerations, the reformer reactor of the present invention is preferably run at a temperature greater than about 1600° F. in order to operate at high hydrocarbon conversions to obtain an optimum H2/[2CO+3CO2] value of greater than or equal to 1.

The feed for reforming is generally a light paraffin, preferably methane or ethane; however, other conventional hydrocarbons which can undergo reforming in a reformer reactor, such as the hydrocarbons discussed above, may be fed to the reformer reactor in one or more feed streams. The product stream consists of hydrogen, carbon monoxide and carbon dioxide, as well as steam and unreacted hydrocarbon.

The integration of a power plant unit with an autothermal reforming process unit is exemplified in the Drawing.

In one preferred embodiment of the process of the present invention, the inorganic metal oxide is copper oxide on an alumina support which provides about 85 mol % to about 95 mol % of the oxidant and oxygen injected into the reformer reactor provides about 5 mol % to about 15 mol % of the oxidant required for the reforming reaction. In another preferred embodiment of the present invention, steam is injected into the reformer reactor to provide a steam-assisted reforming of the hydrocarbon, e.g., methane, while copper oxide particles on an alumina support and nickel catalyst on the same alumina support are fluidized in the reformer reactor and supplemental oxidant gas is introduced into the reformer reactor. The amount of catalyst generally provided when combinations of inorganic metal oxide, supplemental oxidant gas, and catalyst are used in the process of the present invention is not critical as long as there is sufficient reforming of the hydrocarbon to produce syngas. In certain embodiments, the inorganic metal oxide to catalyst ratio is about 50:50; preferably about 60 parts by weight of inorganic metal oxide to about 40 parts by weight of catalyst and more preferably, about 75 parts by weight of inorganic metal oxide to about 25 parts by weight of catalyst.

Referring to the flowsheet in the Drawing, section A shows an autothermal reforming process unit. A pressurized, gaseous feedstream for autothermal reforming, containing methane, and optionally steam in the steam-assisted autothermal reforming embodiments at a steam/carbon (S/C) ratio, for example, of about 0:1 to about 4:1, preferably about 0:1 to about 1.5:1 and more preferably about 0:1 to about 1:1, is introduced through line 1 into reformer reactor 2, which in this example is a fixed fluid bed. Supplemental oxidant, in this example, oxygen, from source D, i.e., supplemental oxidant station D, at a pressure of about 20 psig to about 1000 psig can be introduced into reformer reactor 2 through line 1 (not shown) or through a separate line 1a into reformer reactor 2 to provide the "trim" amount of oxidant discussed above, e.g., less than about 50 mol % of the total oxidant, preferably less than about 25 mol % of the total oxidant and more preferably less than about 15 mol % but greater than about 3 mol % of the total oxidant requirement for the reforming reaction. The feed temperature in line 1a can be ambient temperature or it can be heated. The feed inlet temperature of line 1 can vary between about 300° F. and about 1400° F., preferably about 500° F. to about 1000° F., and more preferably about 600° F. to about 800° F. The reformer reactor 2 contains a bed of fluidized, solid, particulate inorganic metal oxide (not shown) which is at a temperature sufficient to effect autothermal reforming, in this example, about 1650° F. This temperature can be in a range of about 1350° F. to about 2000° F., preferably about 1600° F. to about 1850° F. The pressurized feedstream is introduced into reformer reactor 2 at a pressure of about 300 psig. The reforming fluid beds can operate at a pressure of about 20 psig to about 1000 psig and more preferably about 150 psig to about 450 psig.

Makeup inorganic metal oxide particles and makeup catalyst particles or both can be added to the autothermal reformer unit as required by conventional techniques by feeding it in existing feed lines, either heated or unheated, with hydrocarbon gas, steam, air, and the like, for example, in line 1, or by feeding the particles propelled by hydrocarbon gas, air or steam in a separate feed line (not shown) to one or more components or conduits in the autothermal reformer unit. The makeup particles can be added continuously, if required, or intermittently, as required, for example, as inorganic metal oxide and/or catalyst particles become depleted. The particles may be fed in a feed line to any part of the reforming unit, for example, in a feed line (not shown) to the first fluid bed in reformer reactor 2, in a feed line (not shown) to the second fluid bed in combustor-regenerator 5, in a feed line (not shown) to a transfer line (conduit 4) used for circulating spent inorganic metal oxide from the first fluid bed to the second fluid bed, or in a feed line (not shown) to a transfer line (conduit 6) used for circulating regenerated inorganic metal oxide from the second fluid bed to the first fluid bed. The make-up inorganic metal oxide or catalyst fed to the reforming unit may be an inorganic metal oxide in a reduced or an oxidized state, and it may be fed to autothermal reformer unit at ambient temperature or it may be heated.

A gaseous product effluent containing $H_2$, $CO$, $CO_2$, $H_2O$, and $CH_4$, exits reformer reactor 2 through line 3 at a temperature of from about 1350° F. to about 2000° F., more preferably about 1600° F. to about 1850° F. and a pressure of about 20 psig to about 1000 psig, preferably about 150 psig to about 600 psig, and more preferably about 150 psig to about 450 psig.

Spent inorganic metal oxide (and spent catalyst when present) from the reformer reactor 2 is passed through conduit 4 to the combustor-regenerator 5 for reheating. The combustor-regenerator generally operates at a temperature higher than the reformer reactor with a heat differential supplied by the burning in the combustor-regenerator of light hydrocarbons, such as fuel gas, and coke which may have deposited on the inorganic metal oxide (and on catalyst when present) and from reoxidation of the inorganic metal oxide during the autothermal reforming step. In this example, methane was chosen as the fuel to the combustor-regenerator, copper oxide was chosen as the inorganic metal oxide and oxygen gas was chosen as the supplemental oxidant gas. The temperature differential of combustor-regenerator over reformer reactor in this example is about 150° F. but can be preferably about 20° F. to about 1000° F.; more preferably about 50° F. to about 400° F.; and most preferably about 150° F. to about 200° F. The temperature is related to equipment restrictions. For a given heat requirement in the reformer reactor, the temperature and the circulation rate are related according to the formula $Q=\mu Cp\Delta T$ Q=heat to be transferred to the reformer reactor (Btu/min)

μ=solid flow rate (Btu/min)

Cp=heat capacity (Btu/lb$_m$-F.°)

ΔT=temperature difference (°F.)

In combustor-regenerator 5, a fuel stream comprising fuel mixed with air, in this example containing methane, and 20% stoichiometric excess air, and at about 300 psig or in a range of about 100 to about 1000 psig and at a temperature of about 260° F. or in a range of about 200° F. to about 900° F., is introduced into the combustor-regenerator through lines 7 and 16 and the fuel and coke are burned in the combustor-regenerator to generate heat. The inorganic metal oxide (and catalyst when present) is heated in the combustor-regenerator to a temperature of about 1800° F. or in a range of about 1500° F. to about 2200° F. The regenerated inorganic metal oxide (and regenerated catalyst when present) pass out of the combustor-regenerator 5 through conduit 6 and are conveyed back to reformer reactor 2 propelled by a pressure difference between the reformer reactor and the combustor-regenerator. $P_{comb}>P_{ref}$; ΔP~3–100 psi.

A gaseous product effluent which exits reformer reactor 2 through line 3 is optionally passed to other downstream components such as a shift reactor 42 (optional), steam generator 44, and waste boiler or feed preheater 45, followed by passage through a pressure swing absorber (PSA) 47 (optional) to separate the hydrogen product. These other downstream components are further discussed below.

In section C of the drawing, the steam reforming process is integrated with a cogeneration gas turbine power plant. A cogeneration power plant unit is shown in the Drawing at section B.

Referring again to the Drawing, in the power plant unit in section B, air is conveyed through line 10 into the gas turbine compressor 11. Compressed airflow, at a pressure of about 150 psig and at about 252° F. exits the main compressor through line 12. As shown in the Drawing, section C, a portion of the compressed airflow in line 12 is diverted at juncture 13 into line 14 for the purpose of "borrowing" air and pressure for integration into the autothermal reforming process unit. The drawn off portion of air can have a pressure of about 50 to about 1000 psig, preferably about 150 to about 400 psig and a temperature of about 300° F. to about 900° F., preferably about 400° F. to about 700° F. The diverted compressed air in line 14 is conveyed to a booster compressor 15, which is optional and the pressure of the diverted compressed air in this case is raised to about 300 psig and a temperature of about 307° F. before it exits the optional booster compressor through line 16. The air in line 16 is introduced into the gaseous fuel stream 7 for the combustor-regenerator 5. In this way, air and pressure for the autothermal reforming process unit are obtained from the power plant. Therefore, a separate main compressor is not needed for the autothermal reforming process unit. Optionally, a small booster compressor may be used.

Meanwhile, the remainder of the compressed air in line 12 after juncture 13 is conveyed through line 17 to intersection 18 where hot flue gas in line 19 at about 1800° F. or in a range of about 1500° F. to about 2200° F., preferably about 1650° F. to about 1850° F., and about 300 psig or in a range of about 150 to about 450 psig, in this example containing $CO_2$, $H_2O$, $O_2$, $N_2$ and also containing inorganic metal oxide (and catalyst when present) fines from the combustor-regenerator 5 is mixed with the compressed air in line 17 to form a mixed, recombined gas stream 20. The hot flue gas in line 19 from combustor-regenerator 5 contains fine particles which can result from attrition of the fluidized bed inorganic metal oxide (and catalyst and/or heat transfer particles when present). Attrition normally results from mechanical particle degradation and break up in a fluidized bed. The compressed air in line 17, in this case before mixing is at a temperature of about 252° F. and about 150 psig. The mixing which occurs at intersection 18 adjusts the temperature of the resulting mixed, recombined gas stream to about 1200° F., or in the range of about 700° to about 1600° F., preferably about 1000° to about 1400° F. Thus, the mixture of hot flue gas from the combustor-regenerator and power plant compressed air has a temperature sufficiently lowered to allow passage through conventionally available filters to remove circulating solids, i.e., e.g., inorganic metal oxide fines, catalyst fines when catalyst is present, and heat transfer fines when heat transfer particles are present. Conventionally available filters are generally limited to temperatures below about 1400° F. In the absence of additional heating or cooling of 17 and 19, setting of a maximum mix temperature dictates the relative sizes of the power plant (i.e., power generated) and the autothermal reformer (i.e., hydrogen produced).

After the mixing of gas streams at intersection 18, the mixed gas stream is conveyed through filter 21 by line 20. The mixed gas stream emerges from the filter with inorganic metal oxide fines removed and the mixed stream at a pressure of about 150 psig and a temperature of about 1190° F. is conveyed through line 22 to the power plant combustor 23. Before the mixed gas enters the combustor, fuel for combustion, e.g., methane, at about 250° F. and about 150 psig is introduced through line 22a into line 22 to intermix with the mixed gas stream. The intermixed combustion fuel and gas stream in line 22b at temperature of about 1168° F. and a pressure of about 150 psig and containing, e.g., $CH_4$, $CO_2$, $O_2$, $N_2$, $H_2O$ and preferably containing e.g., about 150–200% excess air, is combusted in the combustor 23 at a temperature of about 2000° F. or in a range of about 1700° F. to about 2800° F., preferably about 2000° F. to about 2300° F., producing combustion flue gas containing, e.g., $CO_2$, $O_2$, $N_2$ and $H_2O$ at 2000° F. and about 150 psig, which is conveyed through line 24 from the combustor to the turbine 25. The inlet temperature of the gas turbine can be in the range of about 1700° to about 2800° F., preferably about 2000° to about 2400° F. Pressure reduction drives the impeller of the turbine. Pressure energy is converted to velocity energy and used to generate power which exits through line 26. Part of the power is diverted through line 27 to run the gas turbine compressor 11. The remainder of the line 27 power in 27a is used elsewhere, e.g., to supplement a refinery.

Hot gas exiting turbine 25 through line 28, in this case, $CO_2$, $O_2$, $N_2$ and $H_2O$, at 1350° F. and 10 psig. is used to produce steam in steam generator 29. Gases exiting the steam generator 29 (e.g., $CO_2$, $O_2$, $N_2$ and $H_2O$ at about 500° F. and about 10 psig) are conveyed through line 30 to waste boiler 31. Gases exiting the waste boiler in line 32 are conveyed to a knock out drum which separates, e.g., water in line 35 and $CO_2$, $O_2$ and $N_2$ in line 34 which can be conveyed to a stack.

In an optional embodiment, in the autothermal reforming process unit in section A, after the gaseous product effluent exits reformer reactor 2 through line 3, the effluent is optionally circulated to a shift reactor 42. Water can be introduced into line 3 to produce steam and thus cool the effluent to an acceptable level for filtration. The effluent is cooled to about 700° F. for high temperature gas shift reaction. The reformer reactor effluent can be also cooled by passing through steam generator 41 to produce steam energy and the temperature of the effluent in line 41a is reduced to about 700° F. The positions of steam generator 41 and filter 40 are reversed if an initial pre-filter cooling mechanism is not employed.

The high temperature gas shift in shift reactor 42 is carried out adiabatically at an inlet temperature of about 700° F. and about 300 psig. Approximately 75% of the carbon monoxide is converted in the shift reactor, as dictated by equilibrium constraints such that the shift reactor effluent 43 contains, e.g., $H_2$, methane, $CO_2$, CO, and $H_2O$ at about 812° F. and 300 psig. The shift reactor effluent in line 43 can be used to produce steam in steam generator 44 thereby cooling the shift reactor effluent to about 500° F. in line 44a. The line 44a effluent is further cooled to 100° F. in waste boiler 45 and water is removed in knock out drum 46 prior to pressure treatment in the swing absorber (PSA) 47 for hydrogen purification. Hydrogen product is collected through line 48.

In a preferred embodiment, the shift reactor is eliminated and the CO, $CO_2$ and methane by-products from the PSA complex containing, e.g., methane, are fed directly to the combustor-regenerator to serve as additional fuel (not shown). In another embodiment, the shift reactor remains in the hydrogen plant design and, similarly to the preferred embodiment, the by-products from PSA, e.g., about CO, $CO_2$ and methane from the PSA 47 at about 100° F. are sent to the combustor-regenerator following compression to the combustor-regenerator following compression to the combustor-regenerator operating pressure (not shown). In both cases, if the autothermal reformer process unit is operated in the steam-assisted mode, to facilitate reduction in the rate of steam to the reformer, and hence to reduce utility costs, steam can be added to the reformer effluent 3 prior to entering the shift reactor 42. In this way, the steam can serve the dual purpose of cooling the reactor effluent and supplementing whatever autothermal reformer reactor steam is in the reformer effluent to maximize conversion in the shift reactor, further reducing utility costs.

In this heat integrated design shown in the Drawing, hydrogen selectivity is not as important as in a conventional hydrogen plant since hydrogen is a co-product with power from the combined cycle power plant, steam generators and waste boilers.

It is the overall efficiency improvement and capital investment savings associated with the production of power, steam and hydrogen that determine the overall uniqueness of this plant when an inorganic metal oxide is used to oxidize hydrocarbon and syngas in conjunction with supplemental oxidant gas in the reformer reactor.

Another embodiment includes a subsequent integration with a methanol plant (not shown). Reformer synthesis gas is conveyed to the methanol unit and reacted to produce methanol. The reaction for the production of methanol requires synthesis gas as the feed. The reaction generally utilizes a zinc-chromium oxide catalyst, a temperature of about 300° F. to about 700° F., a pressure of about 500 to about 5000 psig. A portion of the power required in the syngas (synthesis gas) conversion plant, e.g., a methanol plant or a Fischer-Tropsch plant, can be supplied from the power generated in the cogeneration gas turbine power plant.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for heat integration of an oxidant-supplemented autothermal reformer and a cogeneration power plant in which:

said cogeneration power plant comprises a gas turbine equipped with an air compressor and a combustor;

said autothermal reformer comprises two communicating fluid beds; a first fluid bed comprising a reformer reactor containing inorganic metal oxide capable of undergoing reduction-oxidation reaction cycles and which, with a source of supplemental oxidant gas, oxidizes hydrocarbons at conditions sufficient to produce a mixture comprising synthesis gas hydrogen, carbon monoxide, or carbon dioxide or mixtures thereof, a second fluid bed comprising a combustor-regenerator which receives reduced inorganic metal oxide from the first fluid bed and which provides heat to heat the inorganic metal oxide by combusting fuel gas in direct contact with the inorganic metal oxide, also producing hot flue gas, wherein the inorganic metal oxide circulates between said first-fluid bed and said second fluid bed, the inorganic metal oxide oxidizes hydrocarbon and forms reduced inorganic metal oxide in said first fluid bed in said reformer reactor and the reduced inorganic metal oxide is regenerated, reoxidized and heated in said second fluid bed in said combustor-regenerator and regenerated, oxidized heated inorganic metal oxide is returned to said first fluid bed;

and wherein a portion of compressed air is drawn off from a compressed air stream from the air compressor of the power plant gas turbine air compressor; the drawn off compressed air is introduced to the combustor-regenerator; the hot flue gas from the combustor-regenerator is mixed with the remainder of the power plant compressed air stream to produce a recombined gas stream and this recombined gas stream is fed to the combustor of the cogeneration gas turbine power plant;

said process comprising introducing supplemental oxidant gas into said first fluid bed.

2. The process of claim 1, wherein the supplemental oxidant gas is air, enriched air or oxygen.

3. The process of claim 1, wherein the supplemental oxidant gas is introduced in an amount sufficient to provide less than about 50 mol % of the total oxidant for the reaction with light hydrocarbons.

4. The process of claim 1, wherein the supplemental oxidant gas is introduced in an amount sufficient to provide less than about 25 mol % of the total oxidant for the reaction with light hydrocarbons.

5. The process of claim 1, wherein the supplemental oxidant gas is introduced in an amount sufficient to provide less than about 15 mol % of the total oxidant for the reaction with light hydrocarbons.

6. The process of claim 1, wherein the supplemental oxidant gas is fed to said first fluid bed from a supplemental oxidant gas feed line into the reformer reactor.

7. The process of claim 1, further comprising a reformer reactor containing catalyst and said process comprises circulating catalyst and the inorganic metal oxide, wherein the catalyst is spent in said first fluid bed and is regenerated in said second fluid bed.

8. The process of claims 1 or 7, further comprising feeding steam to the reformer reactor.

9. The process of claim 1, further comprising a reformer reactor and a combustor-regenerator containing heat transfer particles and said process comprises circulating heat transfer particles which are heated in said combustor-regenerator to the reformer reactor where heat is transferred from the particles to the fluidized bed and returning the heat-depleted heat transfer particles to said combustor-regenerator for reheating.

10. The process of claim 1, wherein the pressure of the supplemental oxidant gas is about 20 psig to about 1000 psig.

11. The process of claim 1, wherein the integrated autothermal reformer and cogeneration power plant are further integrated with a synthesis gas conversion plant so that the synthesis gas produced in the reformer is reacted and a portion of power required in the synthesis gas conversion plant is supplied from power generated in the cogeneration gas turbine power plant.

12. A process for reforming hydrocarbon gas in an oxidant-supplemented autothermal reformer in which:

said autothermal reformer comprises two communicating fluid beds; a first fluid bed comprising a reformer reactor containing inorganic metal oxide capable of undergoing reduction-oxidation reaction cycles and which, with a source of supplemental oxidant gas, oxidizes hydrocarbons at conditions sufficient to produce a mixture comprising synthesis gas hydrogen, carbon monoxide, or carbon dioxide or mixtures thereof, a second fluid bed comprising a combustor-regenerator which receives reduced inorganic metal oxide from the first fluid bed and which provides heat to heat the inorganic metal oxide by combusting fuel gas in direct contact with the inorganic metal oxide, also producing hot flue gas, wherein the inorganic metal oxide circulates between said first-fluid bed and said second fluid bed, the inorganic metal oxide oxidizes hydrocarbon and forms reduced inorganic metal oxide in said first fluid bed in said reformer reactor and the reduced inorganic metal oxide is regenerated, reoxidized and heated in said second fluid bed in said combustor-regenerator and regenerated, oxidized heated inorganic metal oxide is returned to said first fluid bed;

said process comprising introducing supplemental oxidant gas into said first fluid bed.

13. The process of claim 12, wherein the supplemental oxidant gas is air, enriched air or oxygen.

14. The process of claim 12, wherein the supplemental oxidant gas is introduced in an amount sufficient to provide less than about 50 mol % of the total oxidant for the reaction with light hydrocarbons.

15. The process of claim 12, wherein the supplemental oxidant gas is introduced in an amount sufficient to provide less than about 25 mol % of the total oxidant for the reaction with light hydrocarbons.

16. The process of claim 12, wherein the supplemental oxidant gas is introduced in an amount sufficient to provide less than about 15 mol % of the total oxidant for the action with light hydrocarbons.

17. The process of claim 1, further comprising a reformer reactor containing catalyst and said process comprises circulating catalyst and the inorganic metal oxide, wherein the catalyst spent in said first fluid bed and is regenerated in said second fluid bed.

18. The process of claims 12 or 17, further comprising feeding steam to the reformer reactor.

19. The process of claim 12, further comprising a reformer reactor and a combustor-regenerator containing heat transfer particles and said process comprises circulating heat transfer particles which are heated in said combustor-regenerator to the reformer reactor where heat is transferred from the particles to the fluidized bed and returning the heat-depleted heat transfer particles to said combustor-regenerator for reheating.

20. The process of claim 12, wherein the pressure of the supplemental oxidant gas is about 20 psig to about 1000 psig.

* * * * *